Apr. 10, 1923.
W. F. STAGGERS
TONGS FOR LIFTING BATTERIES
Filed May 12, 1921
1,451,185
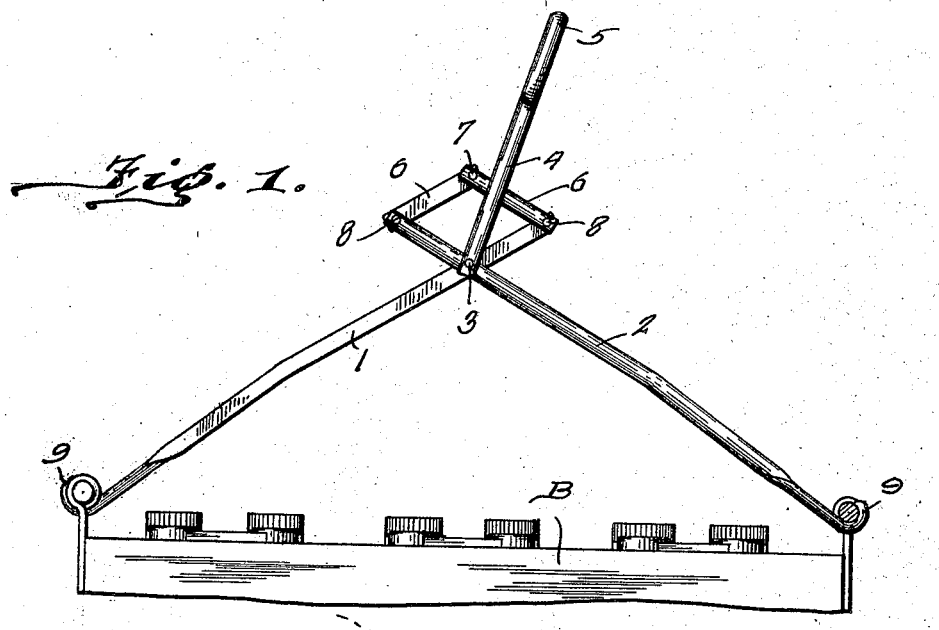
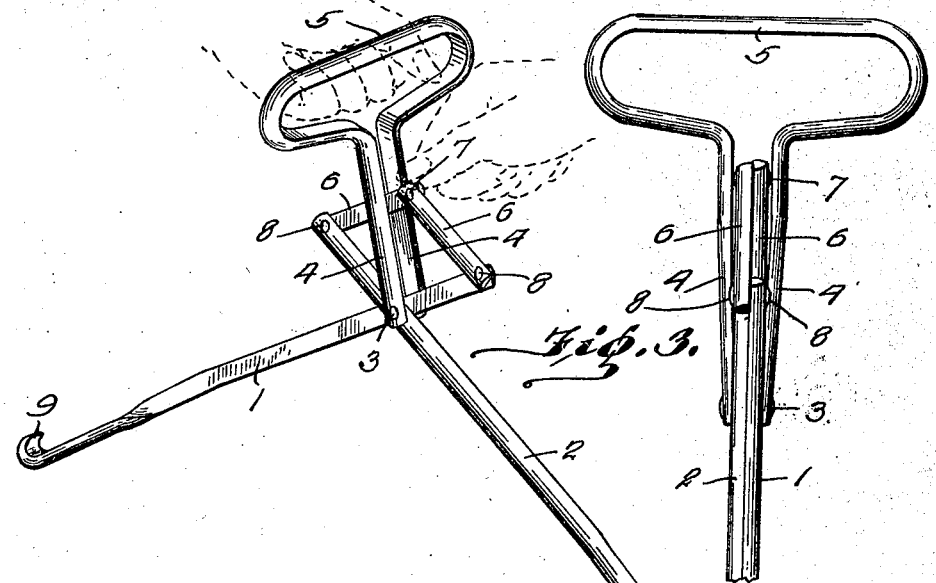
Inventor
Wm F. Staggers Patented Apr. 10, 1923.

1,451,185

UNITED STATES PATENT OFFICE.

WILLIAM F. STAGGERS, OF MANNINGTON, WEST VIRGINIA.

TONGS FOR LIFTING BATTERIES.

Application filed May 12, 1921. Serial No. 468,916.

*To all whom it may concern:*

Be it known that I, WILLIAM F. STAGGERS, a citizen of the United States, residing at Mannington, in the county of Marion and State of West Virginia, have invented a new and useful Tongs for Lifting Batteries, of which the following is a specification.

The object of my invention is to provide a novel type of tongs, having the novel lazy tongs extension, which permits of convenient operation of the device for engaging and lifting articles of various size, such as illustrated in the accompanying drawings, in which—

Figure 1 is a side elevation of the device in use;

Fig. 2 is a perspective view; and

Fig. 3 is a detail edge elevational view of the handle member.

Like characters designate like parts in each of the several views.

Referring to the accompanying drawings, I provide the lifting arms 1 and 2 having like outwardly turned hook ends 9. Arms 1 and 2 are pivotally attached by means of pivot 3 to the spaced approximately parallel arms 4 of the handle 5. I provide links 6 pivoted to each other by pivot 7 and pivotally attached by pivots 8 to the respective tong members 1 and 2, thus forming a lazy tongs element movable between the spaced arms 4 of handle 5.

The operation of the invention is illustrated in Figs. 1 and 2. The hook ends 9 are hooked on to the handles or other suitable portions of the battery B or other article to be lifted, the tong members 1 and 2 being spread apart the required distance by pressing on the end of the lazy tong elements with the hand as indicated in Fig. 2, thus providing a convenient means of quickly adjusting both tong members to engage the article of any size, without the necessity of taking hold of the tong members themselves. By reason of this arrangement the device is much more easily adjusted than tongs of conventional type.

What I claim is—

1. In tongs of the class described, the combination of tong members having outwardly turned hook ends, a handle on which the tong arms are pivotally mounted, and a lazy tongs extension on the ends of the tong elements by means of which the tongs may be readily adjusted for picking up articles of different size said tong arms having only one point of pivotal attachment to the handle and permitting the handle to be swung free from the outer portion of the lazy tongs extension.

2. In tongs of the class described, the combination of a handle member having spaced approximately parallel arms, tong arms pivotally mounted on the handle member, links pivotally attached to the ends of the tong elements and to each other, and forming a lazy tongs extension between the arms of the handle said tong arms having only one point of pivotal attachment to the handle to permit of its being swung free from the outer portion of the lazy tongs extension for manual adjustment thereof.

3. Tongs for lifting batteries, comprising pivoted tong arms, a lazy tongs extension means pivotally mounted on the ends of said arms, and a handle to which the main tong arms are pivotally mounted at a single pivot point spaced from their ends, to permit the lazy tong elements to move to a position in proximity to the handle when the device is in use, substantially as set forth.

WILLIAM F. STAGGERS.